US012154493B1

(12) United States Patent
Chiu et al.

(10) Patent No.: US 12,154,493 B1
(45) Date of Patent: Nov. 26, 2024

(54) MICRO LIGHT-EMITTING DIODE DISPLAY DEVICE

(71) Applicant: PlayNitride Display Co., Ltd., Miaoli County (TW)

(72) Inventors: Po-Wei Chiu, Miaoli County (TW); Sheng-Yuan Sun, Miaoli County (TW); Hoong-Lien Lai, Miaoli County (TW)

(73) Assignee: PLAYNITRIDE DISPLAY CO., LTD., Miaoli County (TW)

( * ) Notice: Subject to any disclaimer, the term of this patent is extended or adjusted under 35 U.S.C. 154(b) by 0 days.

(21) Appl. No.: 18/496,311

(22) Filed: Oct. 27, 2023

(30) Foreign Application Priority Data

Sep. 20, 2023 (TW) ................................ 112135944

(51) Int. Cl.
*G09G 3/32* (2016.01)
*G09G 3/20* (2006.01)

(52) U.S. Cl.
CPC ............. *G09G 3/32* (2013.01); *G09G 3/2074* (2013.01); *G09G 2300/0443* (2013.01); *G09G 2300/0452* (2013.01); *G09G 2320/0233* (2013.01); *G09G 2320/0242* (2013.01); *G09G 2330/023* (2013.01)

(58) Field of Classification Search
CPC ................... G09G 3/32; G09G 3/2074; G09G 2300/0443; G09G 2300/0452; G09G 2320/0233; G09G 2320/0242; G09G 2330/023
See application file for complete search history.

(56) References Cited

U.S. PATENT DOCUMENTS

| | | | | |
|---|---|---|---|---|
| 11,709,403 B2 * | 7/2023 | Geng | G02F 1/1336 349/56 |
| 2007/0085863 A1 * | 4/2007 | Moriya | G09G 3/3607 345/694 |
| 2013/0235094 A1 | 9/2013 | Cok | |
| 2019/0051257 A1 * | 2/2019 | Kabe | G09G 3/3406 |
| 2020/0013975 A1 | 1/2020 | Bibl et al. | |
| 2021/0097929 A1 | 4/2021 | Li | |
| 2022/0005389 A1 | 1/2022 | Liu | |

(Continued)

FOREIGN PATENT DOCUMENTS

| | | |
|---|---|---|
| TW | 201935449 A | 9/2019 |
| TW | 202209725 A | 3/2022 |

(Continued)

*Primary Examiner* — Towfiq Elahi
(74) *Attorney, Agent, or Firm* — Muncy, Geissler, Olds & Lowe, P.C.

(57) ABSTRACT

A micro LED display device in which each pixel unit of the display panel includes a first display pixel and a second display pixel. The first display pixel includes a first subpixel, a second subpixel and a third subpixel, and the second display pixel includes a fourth subpixel, a fifth subpixel and a sixth subpixel. The peak wavelength of fourth subpixel is less than that of first subpixel, and the peak wavelength of fifth subpixel is greater than that of second subpixel, so that at the same radiance, the luminance of second display pixel is greater than that of first display pixel, and the range of color gamut of first display pixel is greater than that of second display pixel. The control unit controls the driving unit to selectively drive the first display pixels or the second display pixels of the pixel units.

17 Claims, 6 Drawing Sheets

(56) References Cited

U.S. PATENT DOCUMENTS

| | | | | |
|---|---|---|---|---|
| 2023/0245617 | A1* | 8/2023 | Lee | G09G 3/2081 345/55 |
| 2023/0247884 | A1* | 8/2023 | Hack | H10K 59/876 257/40 |
| 2023/0363226 | A1* | 11/2023 | Weaver | H10K 59/351 |

FOREIGN PATENT DOCUMENTS

| | | | | |
|---|---|---|---|---|
| WO | WO-2023157170 | A1 * | 8/2023 | H05B 33/14 |
| WO | WO-2023243252 | A1 * | 12/2023 | H04N 25/70 |

* cited by examiner

MICRO LIGHT-EMITTING DIODE DISPLAY DEVICE

CROSS REFERENCE TO RELATED APPLICATIONS

This Non-provisional application claims priority under 35 U.S.C. § 119(a) on Patent Application No(s). 112135944 filed in Taiwan, Republic of China on Sep. 20, 2023, the entire contents of which are hereby incorporated by reference.

BACKGROUND

Technology Field

The present disclosure relates to a display device and, in particular, to a micro LED (Light-Emitting Diode) display device with dual display modes.

Description of Related Art

While the world is paying attention to the future display technology, the micro light-emitting diode (micro LED or μLED) is considered as one of the most promising technologies. In brief, micro LED is a technology of miniaturizing and rearranging LEDs, thereby arranging millions or even tens of millions of dies, which are smaller than 100 microns and thinner than a hair, in an array on a substrate. Compared with the current OLED (organic light-emitting diode) display technology, micro LED display device is also a self-luminous device but utilizes different material. Therefore, the micro LED display device can solve the screen burn-in issue, which is the most deadly problem in OLED display device. Besides, the micro LED display device further has the advantages of low power consumption, high contrast, wide color gamut, high luminance, small and thin size, light weight and energy saving. Therefore, major manufacturers around the world are scrambling to invest in the research and development of micro LED technology.

Color gamut is used to represent the range of colors on a display device that can be viewed by human eyes. For example, the colors that exist in nature can be described through the display device. When the color gamut of the display device is larger (wider range), the viewer can see more colors. In addition, since human eyes are very sensitive to light luminance, the display device can achieve the required efficiency without inputting a large current when the light emitted by the display device is more visual efficient for human eyes. Thus, the display device can save more power.

SUMMARY

An objective of this disclosure is to provide a micro LED (Light-Emitting Diode) display device with dual display modes, which can provide a selection between a display mode with wider color gamut and higher color saturation and another display mode with higher visual efficiency and more power saving according to requirement.

To achieve the above objective, the present disclosure provides a micro LED display device, which includes a display panel, a driving unit and a control unit. The display panel includes a plurality of pixel units, and each pixel unit includes a first display pixel and a second display pixel. The first display pixel includes a first sub-pixel, a second sub-pixel and a third sub-pixel, and the second display pixel includes a fourth sub-pixel, a fifth sub-pixel and a sixth sub-pixel. The peak wavelength of the first sub-pixel is greater than the peak wavelength of the second sub-pixel, the peak wavelength of the second sub-pixel is greater than the peak wavelength of the third sub-pixel, the peak wavelength of the fourth sub-pixel is greater than the peak wavelength of the fifth sub-pixel, and the peak wavelength of the fifth sub-pixel is greater than the peak wavelength of the sixth sub-pixel. The peak wavelength of the fourth sub-pixel is less than the peak wavelength of the first sub-pixel, and the peak wavelength of the fifth sub-pixel is greater than the peak wavelength of the second sub-pixel, so that when the first display pixel and the second display pixel have the same radiance, the luminance of the second display pixel is greater than the luminance of the first display pixel, and the range of color gamut of the first display pixel is greater than the range of color gamut of the second display pixel. The driving unit is electrically connected to the pixel units, and the control unit is electrically connected to the driving unit. The control unit controls the driving unit to selectively drive the first display pixels or the second display pixels of the pixel units.

In the micro LED display device of this disclosure, each pixel unit includes a first display pixel and a second display pixel, the first display pixel includes a first sub-pixel, a second sub-pixel and a third sub-pixel, the second display pixel includes a fourth sub-pixel, a fifth sub-pixel and a sixth sub-pixel, the peak wavelength of the first sub-pixel is greater than the peak wavelength of the second sub-pixel, the peak wavelength of the second sub-pixel is greater than the peak wavelength of the third sub-pixel, the peak wavelength of the fourth sub-pixel is greater than the peak wavelength of the fifth sub-pixel, and the peak wavelength of the fifth sub-pixel is greater than the peak wavelength of the sixth sub-pixel. The peak wavelength of the fourth sub-pixel is less than the peak wavelength of the first sub-pixel, and the peak wavelength of the fifth sub-pixel is greater than the peak wavelength of the second sub-pixel, so that when the first and the second display pixels have the same radiance, the luminance of the second display pixel is greater than the luminance of the first display pixel, and the range of color gamut of the first display pixel is greater than the range of color gamut of the second display pixel. In addition, the control unit controls the driving unit to selectively drive the first display pixels or the second display pixels of the pixel units to emit light so as to display an image. Compared with the conventional micro LED display device, which can display images by one display mode only, this disclosure can provide a micro LED display device with dual display modes, which can provide, according to requirement, a selection between a display mode with wider color gamut and higher color saturation and another display mode with higher visual efficiency and more power saving.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

In the following embodiments, the micro LED (Light-Emitting Diode) display device can be an AM (Active Matrix) micro LED display device or a PM (Passive Matrix) micro LED display device. This disclosure is not limited thereto.

Figure 1A:
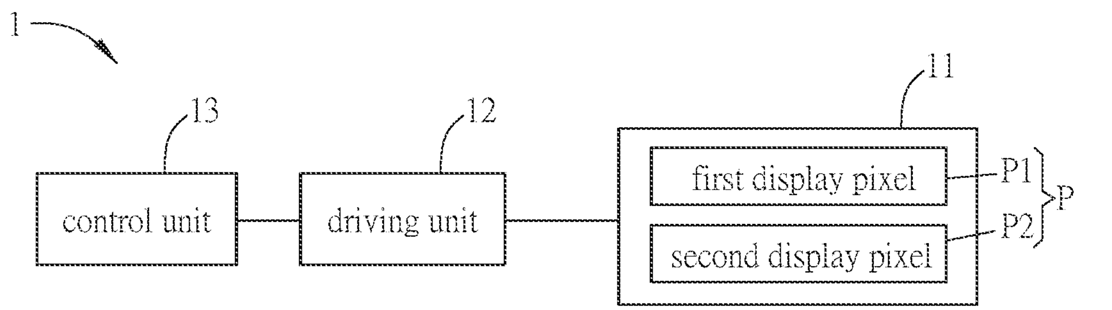
FIG. 1A is a schematic diagram showing a micro LED display device according to an embodiment of this disclosure.
Figure 1B:
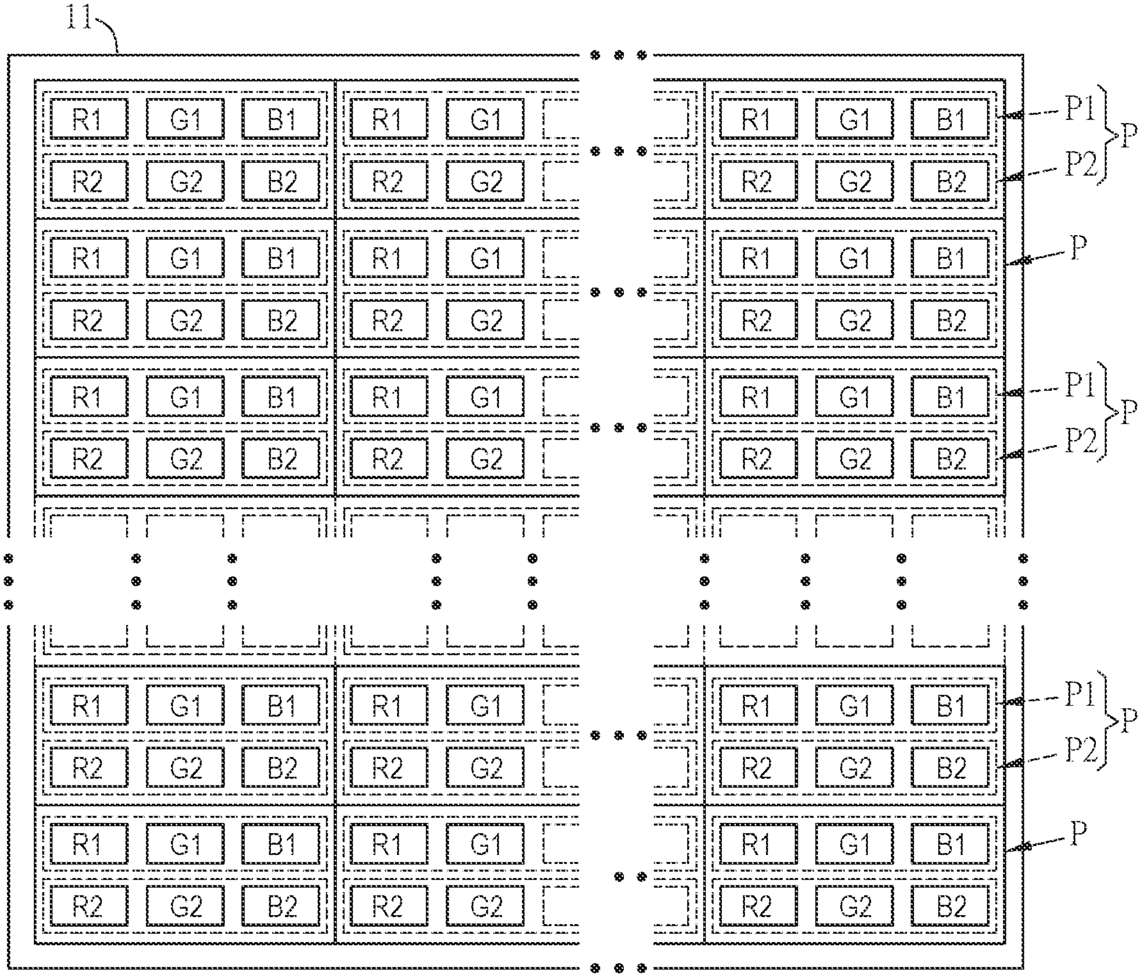
FIG. 1B is a schematic diagram showing the arrangement of pixel units of the display panel in the micro LED display device as shown in FIG. 1A.
Figure 2A:
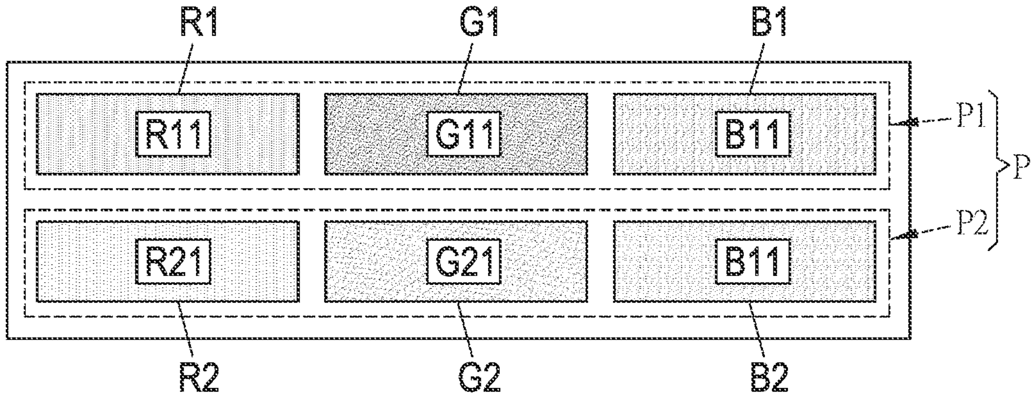
FIG. 2A is a schematic diagram showing the arrangement of pixel units of the display panel as shown in FIG. 1B according to an embodiment.
Figure 2B:
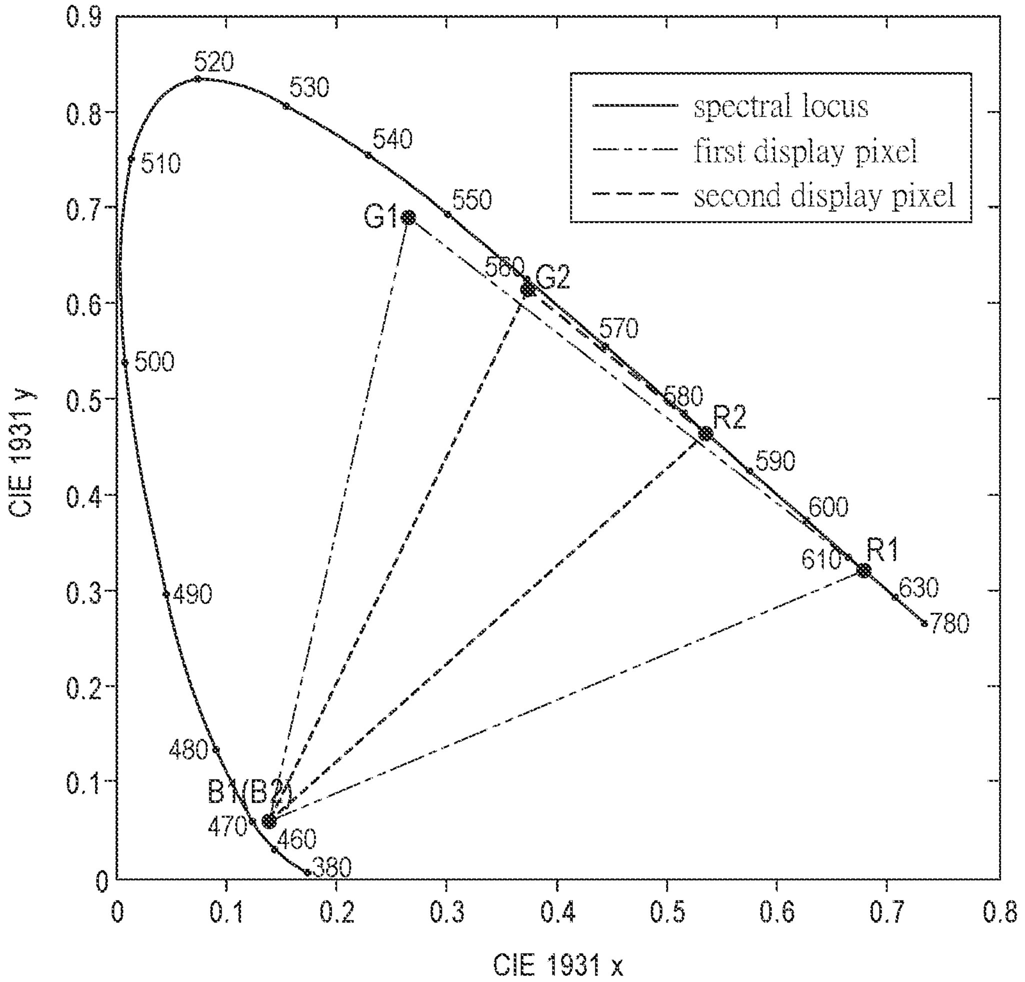
FIG. 2B is a color coordinate diagram of the pixel unit of FIG. 2A.

FIG. 1A is a schematic diagram showing a micro LED display device according to an embodiment of this disclosure, FIG. 1B is a schematic diagram showing the arrangement of pixel units of the display panel in the micro LED display device as shown in FIG. 1A, FIG. 2A is a schematic diagram showing the arrangement of pixel units of the display panel as shown in FIG. 1B according to an embodiment, and FIG. 2B is a color coordinate diagram of the pixel unit of FIG. 2A.

Referring to FIGS. 1A and 1B, the micro LED display device 1 of this embodiment includes a display panel 11, a driving unit 12 and a control unit 13.

The display panel 11 is a micro LED display panel and includes a plurality of pixel units P. To be noted, FIG. 1A only shows one pixel unit P for concise purpose. The pixel units P are arranged in an array including multiple columns and multiple rows, but this disclosure is not limited thereto. In other embodiments, based on the circuit layouts of the display device or user requirement, the pixel units P can be arranged in PenTile matrix, Pearl arrangement, or Honeycomb arrangement. In this embodiment, each pixel unit P includes a first display pixel P1 and a second display pixel P2.

The first display pixel P1 includes a first sub-pixel R1, a second sub-pixel G1, and a third sub-pixel B1. When the first display pixel P1 is activated to emit light, the peak wavelength (λ(R1)) of the first sub-pixel R1 is greater than the peak wavelength (λ(G1)) of the second sub-pixel G1 (λ(R1)>>(G1)), and the peak wavelength (λ(G1)) of the second sub-pixel G1 is greater than the peak wavelength (λ(B1)) of the third sub-pixel B1 (λ(G1)>λ(B1)).

In addition, the second display pixel P2 includes a fourth sub-pixel R2, a fifth sub-pixel G2, and a sixth sub-pixel B2. When the second display pixel P2 is activated to emit light, the peak wavelength (λ(R2)) of the fourth sub-pixel R2 is greater than the peak wavelength (λ(G2)) of the fifth sub-pixel G2 (λ(R2)>λ(G2)), and the peak wavelength (λ(G2)) of the fifth sub-pixel G2 is greater than the peak wavelength (λ(B2)) of the sixth sub-pixel B2 (λ(G2)>λ(B2)).

Furthermore, in this embodiment, the peak wavelength (λ(R2)) of the fourth sub-pixel R2 is less than the peak wavelength (λ(R1)) of the first sub-pixel R1 (λ(R2)<λ(R1)), and the peak wavelength (λ(G2)) of the fifth sub-pixel G2 is greater than the peak wavelength (λ(G1)) of the second sub-pixel G1 (λ(G2)>λ(G1)).

In this embodiment, the first sub-pixel R1 and the fourth sub-pixel R2 are red sub-pixels, but the peak wavelength of the fourth sub-pixel R2 is less than the peak wavelength of the first sub-pixel R1. That is, the peak wavelength of the fourth sub-pixel R2 is closer to the peak wavelength of the luminance efficiency function (e.g. 555 nm) than the peak wavelength of the first sub-pixel R1. In addition, the second sub-pixel G1 and the fifth sub-pixel G2 are green sub-pixels, but the peak wavelength of the fifth sub-pixel G2 is greater than the peak wavelength of the second sub-pixel G1. That is, the peak wavelength of the fifth sub-pixel G2 is closer to the peak wavelength of the luminance efficiency function (e.g. 555 nm) than the peak wavelength of the second sub-pixel G1. Moreover, the third sub-pixel B1 and the sixth sub-pixel B2 are blue sub-pixels, and the peak wavelengths of the third sub-pixel B1 and the sixth sub-pixel B2 are equal.

When the display panel 11 is in a full-grayscale display mode (e.g. full luminance/L255), the first display pixel P1 and the second display pixel P2 of each pixel unit P have the same color points (that is, the same chromaticity coordinates of white point or the same color temperature). Based on the above-mentioned conditions including the relative values of the peak wavelengths of these sub-pixels (R1, G1, B1, R2, G2 and B2) of the first display pixel P1 and the second display pixel P2 of each pixel unit P, as well as the peak wavelength of the fourth sub-pixel R2 being less than the peak wavelength of the first sub-pixel R1, and the peak wavelength of the fifth sub-pixel G2 being greater than the peak wavelength of the second sub-pixel G1, if the first display pixel P1 and the second display pixel P2 have the same radiance, the luminance of the second display pixel P2 can be greater than the luminance of the first display pixel P1, and the range of color gamut of the first display pixel P1 can be greater than the range of color gamut of the second display pixel P2. The term "radiance" is the radiant flux per unit solid angle in a specified direction and per unit area perpendicular to this direction, wherein the radiant flux is generally measured in watts. In addition, the term "luminance" is the luminous flux per unit solid angle in a specified direction and per unit area perpendicular to this direction, wherein luminous flux is generally measured in lumens. The luminous flux is a weighted sum of the power at all wavelengths in the visible band, and the ratio of the total luminous flux to the radiant flux is the luminous efficacy, so that the radiant flux can be obtained by calculating with the luminous flux.

The driving unit 12 is electrically connected to the pixel units P, and the driving unit 12 is configured to drive the pixel units P to emit light so as to display an image. In one embodiment, the driving unit 12 may include a scan driving circuit and a data driving circuit (not shown). The scan driving circuit includes a plurality of scan lines (not shown) that are electrically connected to the pixel units P, and the data driving circuit includes a plurality of data lines (not shown) that are electrically connected to the pixel units P. When the scan signals outputted by the scan driving circuit sequentially are transmitted to the scan lines to conduct the pixel units P of each column in sequence, the data driving circuit can transmit the data signals to the pixel units P of each column correspondingly through the data lines. Thus, the pixel units P can be driven or turned on to emit light, thereby displaying images.

The control unit 13 is electrically connected to the driving unit 12. The control unit 13 can output a control signal to control the driving unit 12 to selectively drive the first display pixels P1 or the second display pixels P2 in the pixel units P, so that the first display pixels P1 or the second display pixels P2 in the pixel units P can be driven to emit light so as to display an image. In one embodiment, the control unit 13 can be implemented by software, hardware or firmware.

Referring to FIG. 2A, in this embodiment, the first sub-pixel R1 includes a red-light micro LED R11, and the fourth sub-pixel R2 includes another red-light micro LED R21, wherein the wavelength of the red-light micro LED R21 is different from that of the red-light micro LED R11. In one embodiment, for example, the peak wavelength of the first sub-pixel R1 is 629 nm, and the peak wavelength of the fourth sub-pixel R2 is 587 nm. In addition, as shown in FIG. 2B, in the CIE 1931 color coordinate system, the x-coordinate value of the first sub-pixel R1 is greater than the x-coordinate value of the fourth sub-pixel R2 (x-coordinate value: R1>R2). The y-coordinate value of the first sub-pixel R1 is less than the y-coordinate value of the fourth sub-pixel R2 (y-coordinate value: R1<R2). In this case, the first sub-pixel R1 may be dark red, and the fourth sub-pixel R2 may be light red. In one embodiment, the difference between the peak wavelength of the first sub-pixel R1 and the peak wavelength of the fourth sub-pixel R2 may be, for example, greater than 40 nm. In one embodiment, the peak wavelength of the first sub-pixel R1 is 640 nm, and the peak wavelength of the fourth sub-pixel R2 is 600 nm.

Referring to FIG. 2A again, in this embodiment, the second sub-pixel G1 includes a green-light micro LED G11, and the fifth sub-pixel G2 includes another green-light micro LED G21, wherein the wavelength of the green-light micro LED G21 is different from that of the green-light micro LED G11. In one embodiment, for example, the peak wavelength of the second sub-pixel G1 is 539 nm, and the peak wavelength of the fifth sub-pixel G2 is 557 nm. In addition, as shown in FIG. 2B, in the CIE 1931 color coordinate system, the x-coordinate value of the second sub-pixel G1 is less than the x-coordinate value of the fifth sub-pixel G2 (x-coordinate value: G1<G2). The y-coordinate value of the second sub-pixel G1 is greater than the y-coordinate value of the fifth sub-pixel G2 (y-coordinate value: G1>G2). In this case, the second sub-pixel G1 may be dark green, and the fifth sub-pixel G2 may be light green. In one embodiment, the difference between the peak wavelength of the second sub-pixel G1 and the peak wavelength of the fifth sub-pixel G2 may be, for example, greater than 10 nm. In one embodiment, the peak wavelength of the second sub-pixel G1 is 530 nm, and the peak wavelength of the fifth sub-pixel G2 is 545 nm.

Moreover, referring to FIG. 2A again, the third sub-pixel B1 and the sixth sub-pixel B2 in this embodiment are blue sub-pixels, and the third sub-pixel B1 and the sixth sub-pixel B2 respectively include a blue-light micro LED B11 with the same peak wavelength (light wavelength). In different embodiments, the wavelengths of the blue-light micro LEDs of the third sub-pixel B1 and the sixth sub-pixel B2 can have different options and configurations, which will be described below.

To be noted, in this embodiment, the difference between the peak wavelength of the fourth sub-pixel R2 and the peak wavelength of the fifth sub-pixel G2 must be greater than 25 nm and less than 35 nm to maintain a qualified color gamut performance. If the peak wavelength of the fourth sub-pixel R2 is too close to the peak wavelength of the fifth sub-pixel G2, the red light and the green light may not be easily distinguished (biased to yellow light), which will generate a negative influence on the color gamut performance. In one embodiment, when the target is greater than 60% of NTSC standard, the difference between the peak wavelength of the fourth sub-pixel R2 and the peak wavelength of the fifth sub-pixel G2 must be greater than 40 nm and less than 60 nm. Therefore, the peak wavelength of the fourth sub-pixel R2 is preferably between 600 nm and 620 nm, and the peak wavelength of the fifth sub-pixel G2 is preferably between 540 nm and 550 nm.

As mentioned above, in the micro LED display device 1 of this embodiment, each pixel unit P of the display panel 11 includes two display pixels (a first display pixel P1 and a second display pixel P2). The peak wavelength of the first sub-pixel R1 is greater than the peak wavelength of the second sub-pixel G1, the peak wavelength of the second sub-pixel G1 is greater than the peak wavelength of the third sub-pixel B1, the peak wavelength of the fourth sub-pixel R2 is greater than the peak wavelength of the fifth sub-pixel G2, and the peak wavelength of the fifth sub-pixel G2 is greater than the peak wavelength of the sixth sub-pixel B2. In addition, the peak wavelength of the fourth sub-pixel R2 is less than the peak wavelength of the first sub-pixel R1, and the peak wavelength of the fifth sub-pixel G2 is greater than the peak wavelength of the second sub-pixel G1, so that when the first display pixel P1 and the second display pixel P2 have the same radiance, the luminance of the second display pixel P2 is greater than the luminance of the first display pixel P1, and the range of color gamut of the first display pixel P1 is greater than the range of color gamut of the second display pixel P2.

In addition, the control unit 13 can output a control signal to control the driving unit 12 to only drive the first display pixels P1 (i.e., sub-pixels R1, G1 and B1) to emit light so as to display images in a time period. In another time period, the control unit 13 controls the driving unit 12 switches the display mode, so that the driving unit 12 only drives the second display pixels P2 (i.e., the sub-pixels R2, G2 and B2) to emit light so as to display images. Compared with the conventional micro LED display device that can only display images in one display mode, the micro LED display device 1 of this embodiment is a micro LED display device with dual display modes, which can provide, according to user's requirement, a selection between a display mode with utilizing the first display pixels P1 to display images that has wider color gamut and higher color saturation and another display mode with utilizing the second display pixels P2 to display images that has higher visual efficiency and more power saving.

Figure 3A:
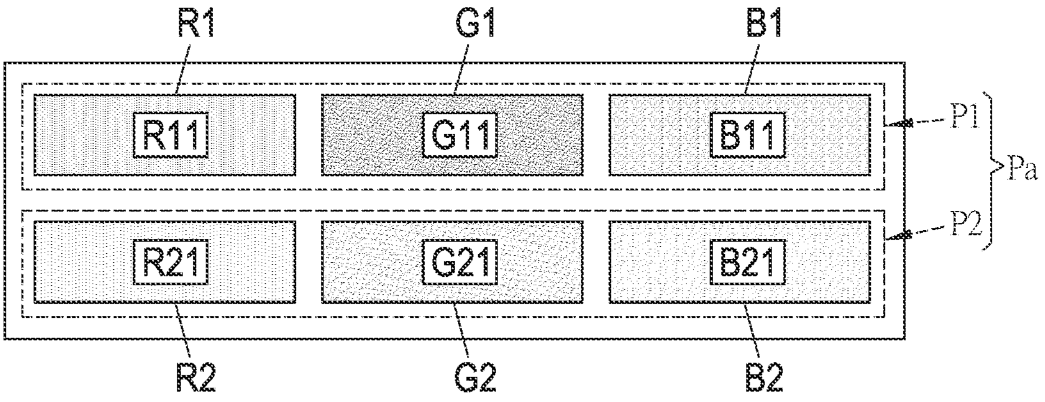
FIG. 3A is a schematic diagram showing the arrangement of pixel units of the display panel as shown in FIG. 1B according to another embodiment.
Figure 3B:
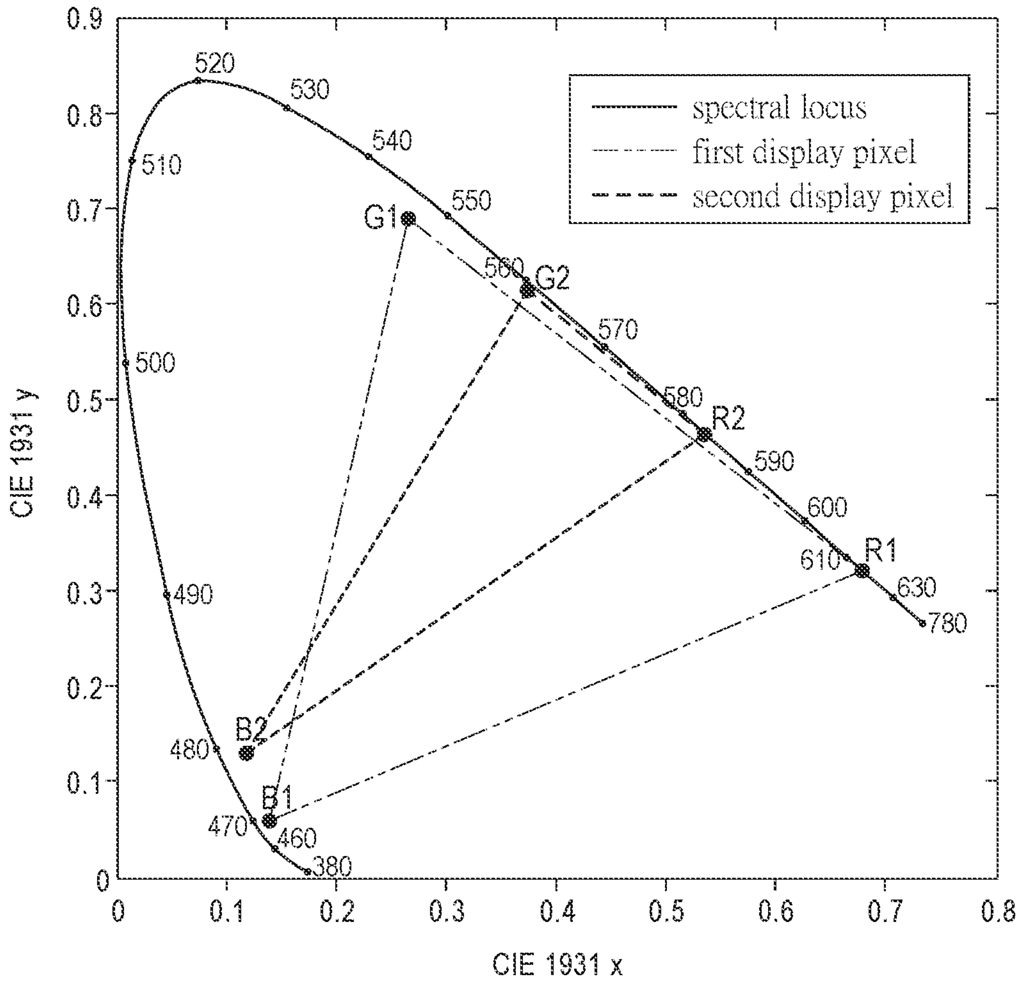
FIG. 3B is a color coordinate diagram of the pixel unit of FIG. 3A.

FIG. 3A is a schematic diagram showing the arrangement of pixel units of the display panel as shown in FIG. 1B according to another embodiment, and FIG. 3B is a color coordinate diagram of the pixel unit of FIG. 3A.

The pixel unit Pa as shown in FIG. 3A is mostly the same as the pixel unit P of FIG. 2A. Unlike the pixel unit P of FIG. 2A, in the pixel unit Pa of this embodiment, the peak wavelength λ(B2) of the sixth sub-pixel B2 is greater than the peak wavelength λ(B1) of the third sub-pixel B1 (λ(B2)>λ(B1)). That is, the peak wavelength of the sixth sub-pixel B2 is closer to the peak wavelength of the luminance efficiency function (e.g. 555 nm) than the peak wavelength of the third sub-pixel B1. In this embodiment, the third sub-pixel B1 includes a blue-light micro LED B11, and the sixth sub-pixel B2 includes another blue-light micro LED B21, wherein the wavelength of the blue-light micro LED B21 is different from that of the blue-light micro LED B11.

In addition, as shown in FIG. 3B, in the CIE 1931 color coordinate system, the x-coordinate value of the third sub-pixel B1 is greater than the x-coordinate value of the sixth sub-pixel B2 (x-coordinate value: B1>B2). The y-coordinate value of the third sub-pixel B1 is less than the y-coordinate value of the sixth sub-pixel B2 (y-coordinate value: B1<B2). In this case, the third sub-pixel B1 may be dark blue, and the sixth sub-pixel B2 may be light blue. In one embodiment, the difference between the peak wavelength of the third sub-pixel B1 and the peak wavelength of the sixth sub-pixel B2 may be, for example, greater than or equal to 10 nm. In one embodiment, the peak wavelength of the third sub-pixel B1 is 460 nm, and the peak wavelength of the sixth sub-pixel B2 is 476 nm. In another embodiment, the peak wavelength of the third sub-pixel B1 is 450 nm, and the peak wavelength of the sixth sub-pixel B2 is 460 nm.

In addition, the relationships of the wavelengths of the first sub-pixel R1 and the second sub-pixel G1 of the first display pixel P1 and the fourth sub-pixel R2 and the fifth sub-pixel G2 of the second display pixel P2 are the same as those of the pixel unit P as shown in FIG. 2A.

FIGS. 4A to 4F are schematic diagrams showing the arrangements of pixel units of the display panel as shown in FIG. 1B according to different embodiments.

Figure 4A:
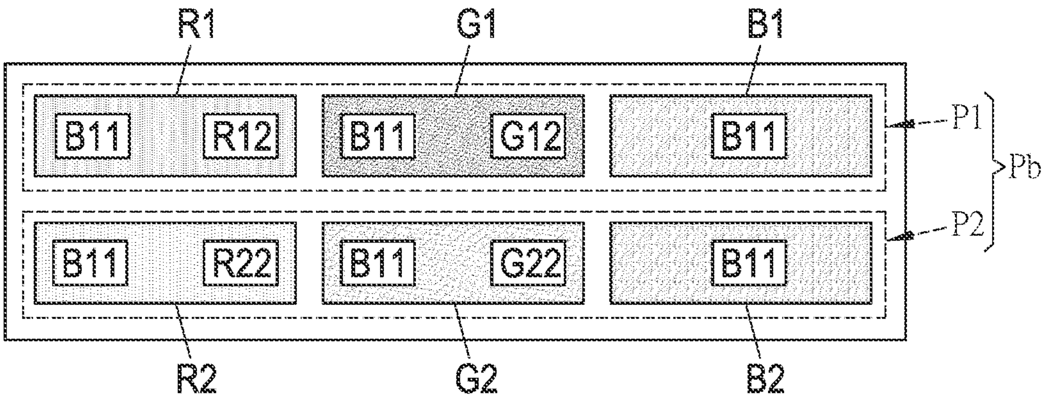
FIGS. 4A to 4F are schematic diagrams showing the arrangements of pixel units of the display panel as shown in FIG. 1B according to different embodiments.

The pixel unit Pb as shown in FIG. 4A is mostly the same as the pixel unit P of FIG. 2A. Unlike the pixel unit P of FIG. 2A, in the pixel unit Pb of this embodiment, the light wavelength of the blue-light micro LEDs B11 arranged in the second display pixel P2 are equal to the light wavelength of the blue-light micro LEDs B11 arranged in the first display pixel P1. In other words, each of the first sub-pixel R1, the second sub-pixel G1, the third sub-pixel B1, the fourth sub-pixel R2, the fifth sub-pixel G2 and the sixth sub-pixel B2 includes a blue-light micro LED B11, and the light wavelengths of these blue-light micro LEDs B11 are all the same. In addition, the first sub-pixel R1 further includes a red-light color conversion material R12, and the fourth sub-pixel R2 further includes another red-light color conversion material R22, wherein the radiation wavelength of the red-light color conversion material R12 is different from that of the red-light color conversion material R22. The second sub-pixel G1 further includes a green-light color conversion material G12, and the fifth sub-pixel G2 further includes another green-light color conversion material G22, wherein the radiation wavelength of the green-light color conversion material G12 is different from that of the green-light color conversion material G22. In this embodiment, the radiation wavelengths of these color conversion materials are defined as follow: $\lambda(R2)<\lambda(R1)$ and $\lambda(G2)>\lambda(G1)$. In one embodiment, these color conversion materials (R12, R22, G12 and G12) can be, for example but not limited to, quantum dots (QD) or phosphors.

Figure 4B:
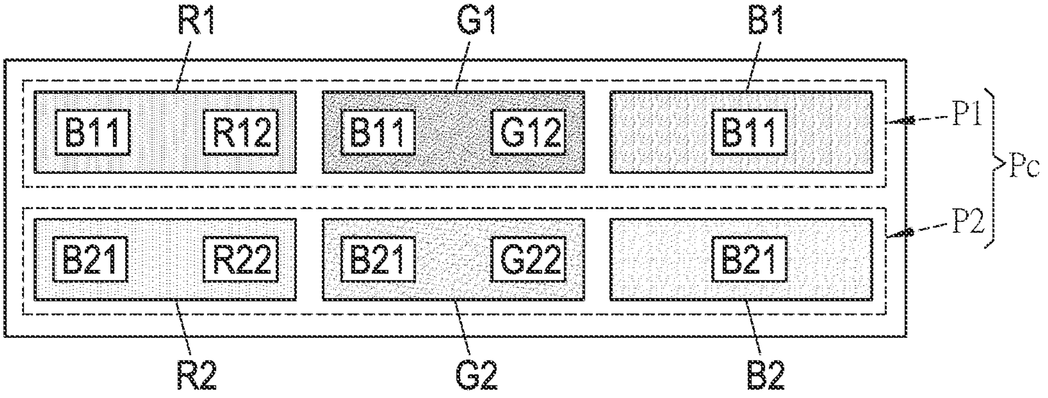

The pixel unit Pc as shown in FIG. 4B is mostly the same as the pixel unit Pb of FIG. 4A. Unlike the pixel unit Pb of FIG. 4A, in the pixel unit Pc of this embodiment, the light wavelength of the blue-light micro LEDs B21 arranged in the second display pixel P2 are greater than the light wavelength of the blue-light micro LEDs B11 arranged in the first display pixel P1. In other words, each of the first sub-pixel R1, the second sub-pixel G1 and the third sub-pixel B1 includes a blue-light micro LED B11, and each of the fourth sub-pixel R2, the fifth sub-pixel G2 and the sixth sub-pixel B2 includes another blue-light micro LED B21, wherein the light wavelength of the blue-light micro LEDs B11 is different from that of the blue-light micro LED B21. In this embodiment, the light wavelengths of the third sub-pixel B1 and the sixth sub-pixel B2 are defined as follow: $\lambda(B2)>\lambda(B1)$.

Figure 4C:
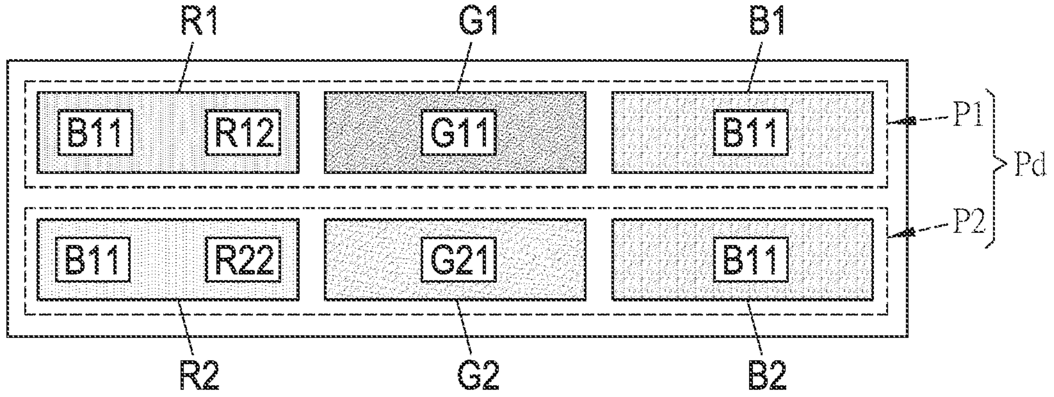

The pixel unit Pd as shown in FIG. 4C is mostly the same as the pixel unit Pb of FIG. 4A. Unlike the pixel unit Pb of FIG. 4A, in the pixel unit Pd of this embodiment, the first sub-pixel R1 of the first display pixel P1 includes a red-light color conversion material R12, the second sub-pixel G1 includes a green-light LED G11, and the fourth sub-pixel R2 of the second display pixel P2 further includes another red-light color conversion material R22, and the fifth sub-pixel G2 includes another green-light LED G21, wherein the radiation wavelength of the red-light color conversion material R22 is different from that of the red-light color conversion material R12, and the light wavelength of the green-light LED G11 is different from that of the green-light LED G21. In this case, the light wavelengths are defined as follow: $\lambda(G2)>\lambda(G1)$. Therefore, the main difference between the pixel unit Pd in FIG. 4C and the pixel unit Pb in FIG. 4A is that, in the pixel unit Pd, the first sub-pixel R1 and the fourth sub-pixel R2 can emit red light by utilizing the light emitted from the blue-light micro LED B11 to excite the red-light color conversion materials. This configuration can have better luminous efficiency. In addition, the second sub-pixel G1 and the fifth sub-pixel G2 are respectively configured with the green-light micro LED G11 and the green-light micro LED G21 to emit green light, wherein no green-light color conversion material is used. This configuration can avoid the energy loss of the additional color conversion process.

To be understood, in different embodiments (not shown), the wavelengths of the blue-light micro LEDs of the third sub-pixel B1 and the sixth sub-pixel B2 can have different options and configurations, so that the wavelength of the blue-light micro LED of the sixth sub-pixel B2 can be greater than that of the third sub-pixel B1 (as shown in FIG. 3A).

Figure 4D:
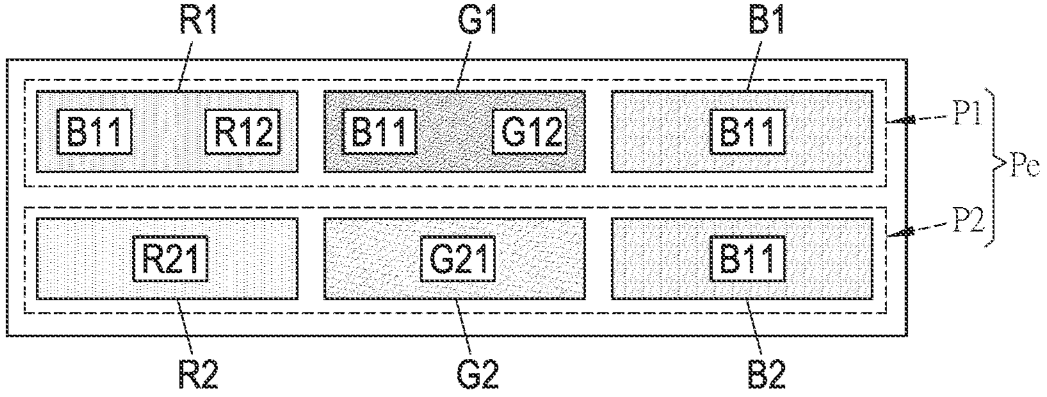

The pixel unit Pe as shown in FIG. 4D is mostly the same as the pixel unit P of FIG. 2A. Unlike the pixel unit P of FIG. 2A, in the pixel unit Pe of this embodiment, each of the first sub-pixel R1, the second sub-pixel G1, the third sub-pixel B1, and the sixth sub-pixel B2 includes a blue-light micro LED B11, wherein the light wavelengths of these blue-light micro LED B11 are the same. In addition, the first sub-pixel R1 further includes a red-light color conversion material R12, and the second sub-pixel G1 further includes a green-light color conversion material G12. In other words, in the first display pixel P1, the first sub-pixel R1 includes a blue-light micro LED B11 in cooperated with a red-light color conversion material R12, and the second sub-pixel G1 includes a blue-light micro LED B11 with the same light wavelength and a green-light color conversion material G12. In addition, in the second display pixel P2, the fourth sub-pixel R2 includes a red-light micro LED R21, and the fifth sub-pixel G2 includes a green-light micro LED G21.

To be understood, in different embodiments (not shown), the wavelengths of the blue-light micro LEDs of the third sub-pixel B1 and the sixth sub-pixel B2 can have different options and configurations, so that the wavelength of the blue-light micro LED of the sixth sub-pixel B2 can be greater than that of the third sub-pixel B1 (as shown in FIG. 3A).

Figure 4E:
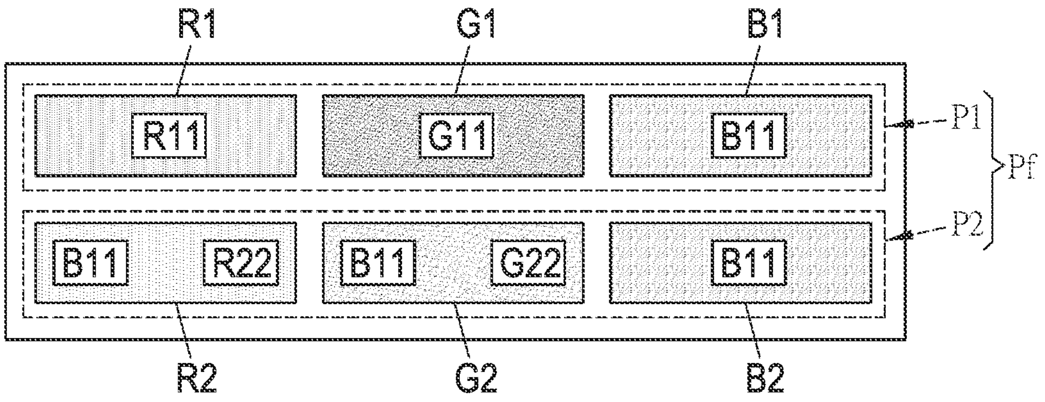

Furthermore, the pixel unit Pf as shown in FIG. 4E is mostly the same as the pixel unit P of FIG. 2A. Unlike the pixel unit P of FIG. 2A, in the pixel unit Pf of this embodiment, each of the third sub-pixel B1, the fourth sub-pixel R2, the fifth sub-pixel G2 and the sixth sub-pixel B2 includes a blue-light micro LED B11, wherein the light wavelengths of the blue-light micro LEDs B11 are all the same. In addition, the fourth sub-pixel R2 further includes a red-light color conversion material R22, and the fifth sub-pixel G2 further includes a green-light color conversion material G22. In this embodiment, the radiation wavelengths of the color conversion materials are defined as follow: λ(R2)<λ(R1) and λ(G2)>λ(G1).

To be understood, in different embodiments (not shown), the wavelengths of the blue-light micro LEDs of the third sub-pixel B1 and the sixth sub-pixel B2 can have different options and configurations, so that the wavelength of the blue-light micro LED of the sixth sub-pixel B2 can be greater than that of the third sub-pixel B1 (as shown in FIG. 3A).

To be noted, the configurations and arrangements of the above-mentioned micro LEDs and color conversion materials can be used in any combinations. For example, all sub-pixels in the pixel units can each include a blue-light micro LED B11 with the same light wavelength, while the first sub-pixel R1 further includes a red-light color conversion material R12, and the fifth sub-pixel G2 further includes a green-light color conversion material G22. In another case, the second sub-pixel G1 further includes a green-light color conversion material G12, and the fourth sub-pixel R2 further includes a red-light color conversion material R22. The combination aspects of the micro LEDs and color conversion materials in this disclosure is not limited.

In different embodiments, each sub-pixel in the pixel unit can emit a white light by light mixing in advance, and then generate the red, green and blue lights through the red, green and blue color filters.

Figure 4F:
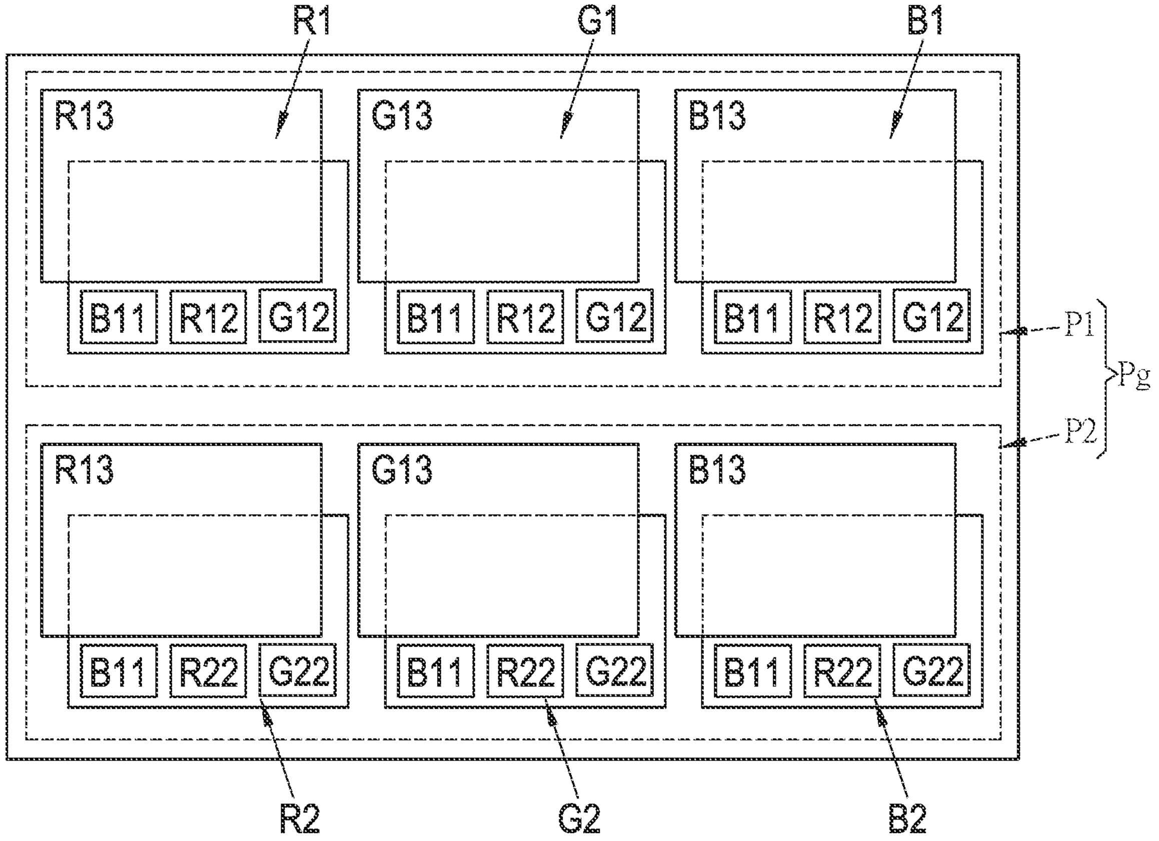

For example, as shown in FIG. 4F, each sub-pixel in the pixel unit Pg of this embodiment (i.e., each of the first sub-pixel R1, the second sub-pixel G1, the third sub-pixel B1, the fourth sub-pixel R2, the fifth sub-pixel G2 and the sixth sub-pixel B2) includes a blue-light micro LED B11, a red-light color conversion material (R12, R22) and a green-light color conversion material (G12, G22). In this case, the blue-light micro LEDs B11 have the same light wavelength, each of the first sub-pixel R1, the second sub-pixel G1 and the third sub-pixel B1 includes a red-light color conversion material R12, and each of the fourth sub-pixel R2, the fifth sub-pixel G2 and the sixth sub-pixel B2 includes another red-light color conversion material R22. In addition, each of the first sub-pixel R1, the second sub-pixel G1 and the third sub-pixel B1 further includes a green-light color conversion material G12, and each of the fourth sub-pixel R2, the fifth sub-pixel G2 and the sixth sub-pixel B2 further includes another green-light color conversion material G22. The radiation wavelength of the red-light color conversion materials R22 disposed in the second display pixel P2 is less than the radiation wavelength of the red-light color conversion materials R12 disposed in the first display pixel P1 (i.e., the wavelengths of the red-light color conversion materials are defined as: λ(R2)<λ(R1)). In addition, the radiation wavelength of the green-light color conversion materials G22 disposed in the second display pixel P2 is greater than the radiation wavelength of the green-light color conversion materials G12 disposed in the first display pixel P1 (i.e., the wavelengths of the green-light color conversion materials are defined as: λ(G2)>λ(G1)).

Therefore, the sub-pixels (R1, G1 and B1) in the first display pixel P1 each include a blue-light micro LED B11 with the same light wavelength, and are each configured with a red-light color conversion material R12 and a green-light color conversion material G12 so as to generate white light, and the sub-pixels (R2, G2 and B2) in the second display pixel P2 each include a blue-light micro LED B11 with the same light wavelength, and are each configured with a red-light color conversion material R22 and a green-light color conversion material G22 so as to generate white light. Accordingly, when the first display pixel P1 and the second display pixel P2 have the same radiance, the luminance of the second display pixel P2 is greater than the luminance of the first display pixel P1.

In addition, in the pixel unit Pg, each of the first sub-pixel R1 and the fourth sub-pixel R2 further includes a red color filter R13, each of the second sub-pixel G1 and the fifth sub-pixel G2 further includes a green color filter G13, and each of the third sub-pixel B1 and the sixth sub-pixel B2 further includes a blue color filter B13. The configurations of the red color filters R13, the green color filters G13 and the blue color filters B13 can make the sub-pixels that emit white lights correspondingly generate red, green and blue lights, and the range of color gamut of the first display pixel P1 is greater than the range of color gamut of the second display pixel P2.

To be understood, in different embodiments (not shown), the wavelengths of the blue-light micro LEDs in the first display pixel P1 and the second display pixel P2 can have different options and configurations, so that the wavelength of the blue-light micro LED in the second display pixel P2 can be greater than that in the first display pixel P1 (as shown in FIG. 3A).

In one embodiment, the micro LED display device of this disclosure can be used in a reading mode to display text documents. When the displayed content is, for example, an image including black characters on a white background and there is no specific requirement for color gamut performance, the control unit can control the driving unit to drive the second display pixels to display the images so as to achieve power saving effect while watching or reading for a long time. In one embodiment, the control unit can control the driving unit to selectively drive the first display pixels of the pixel units to display color images, or drive the second display pixels of the pixel units to display black-and-white images.

In summary, in the micro LED display device of this disclosure, each pixel unit includes a first display pixel and a second display pixel, the first display pixel includes a first sub-pixel, a second sub-pixel and a third sub-pixel, the second display pixel includes a fourth sub-pixel, a fifth sub-pixel and a sixth sub-pixel, the peak wavelength of the first sub-pixel is greater than the peak wavelength of the second sub-pixel, the peak wavelength of the second sub-pixel is greater than the peak wavelength of the third sub-pixel, the peak wavelength of the fourth sub-pixel is greater than the peak wavelength of the fifth sub-pixel, and the peak wavelength of the fifth sub-pixel is greater than the peak wavelength of the sixth sub-pixel. The peak wavelength of the fourth sub-pixel is less than the peak wavelength of the first sub-pixel, and the peak wavelength of the fifth sub-pixel is greater than the peak wavelength of the second sub-pixel, so that when the first and the second display pixels have the same radiance, the luminance of the second display pixel is greater than the luminance of the first display pixel, and the range of color gamut of the first display pixel is greater than the range of color gamut of the second display pixel. In addition, the control unit controls the driving unit to selectively drive the first display pixels or the second display pixels of the pixel units to emit light so as to display an image. Compared with the conventional micro LED display device, which can display images by one display mode only, this disclosure can provide a micro LED display device with dual display modes, which can provide, according to requirement, a selection between a display mode with wider color gamut and higher color saturation and another display mode with higher visual efficiency and more power saving.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A micro light-emitting diode display device, comprising:

a display panel comprising a plurality of pixel units, wherein each of the pixel units comprises a first display pixel and a second display pixel, the first display pixel comprises a first sub-pixel, a second sub-pixel and a third sub-pixel, the second display pixel comprises a fourth sub-pixel, a fifth sub-pixel and a sixth sub-pixel, a peak wavelength of the first sub-pixel is greater than a peak wavelength of the second sub-pixel, the peak wavelength of the second sub-pixel is greater than a peak wavelength of the third sub-pixel, a peak wavelength of the fourth sub-pixel is greater than a peak wavelength of the fifth sub-pixel, the peak wavelength of the fifth sub-pixel is greater than a peak wavelength of the sixth sub-pixel, the peak wavelength of the fourth sub-pixel is less than the peak wavelength of the first sub-pixel, and the peak wavelength of the fifth sub-pixel is greater than the peak wavelength of the second sub-pixel, so that when the first display pixel and the second display pixel have the same radiance, a luminance of the second display pixel is greater than a luminance of the first display pixel, and a range of color gamut of the first display pixel is greater than a range of color gamut of the second display pixel;

a driving unit electrically connected to the pixel units; and a control unit electrically connected to the driving unit, wherein the control unit controls the driving unit to selectively drive the first display pixels or the second display pixels of the pixel units.

2. The micro light-emitting diode display device of claim 1, wherein when the display panel is in a full-grayscale display mode, the first display pixel and the second display pixel of one of the pixel units have the same color points.

3. The micro light-emitting diode display device of claim 1, wherein in CIE 1931 color coordinate system, x-coordinate value of the first sub-pixel is greater than x-coordinate value of the fourth sub-pixel, and y-coordinate value of the first sub-pixel is less than y-coordinate value of the fourth sub-pixel.

4. The micro light-emitting diode display device of claim 1, wherein in CIE 1931 color coordinate system, x-coordinate value of the second sub-pixel is less than x-coordinate value of the fifth sub-pixel, and y-coordinate value of the second sub-pixel is greater than y-coordinate value of the fifth sub-pixel.

5. The micro light-emitting diode display device of claim 1, wherein a difference between the peak wavelength of the first sub-pixel and the peak wavelength of the fourth sub-pixel is greater than 40 nm, and a difference between the peak wavelength of the fifth sub-pixel and the peak wavelength of the second sub-pixel is greater than 10 nm.

6. The micro light-emitting diode display device of claim 1, wherein a difference between the peak wavelength of the fourth sub-pixel and the peak wavelength of the fifth sub-pixel is greater than 25 nm and less than 35 nm.

7. The micro light-emitting diode display device of claim 1, wherein the first sub-pixel comprises a red-light micro LED, the fourth sub-pixel comprises another red-light micro LED, the second sub-pixel comprises a green-light micro LED, and the fifth sub-pixel comprises another green-light micro LED.

8. The micro light-emitting diode display device of claim 1, wherein the peak wavelength of the sixth sub-pixel is greater than the peak wavelength of the third sub-pixel.

9. The micro light-emitting diode display device of claim 8, wherein a difference between the peak wavelength of the sixth sub-pixel and the peak wavelength of the third sub-pixel is greater than or equal to 10 nm.

10. The micro light-emitting diode display device of claim 8, wherein in CIE 1931 color coordinate system, x-coordinate value of the third sub-pixel is greater than x-coordinate value of the sixth sub-pixel, and y-coordinate value of the third sub-pixel is less than y-coordinate value of the sixth sub-pixel.

11. The micro light-emitting diode display device of claim 8, wherein the third sub-pixel comprises a blue-light micro LED, and the sixth sub-pixel comprises another blue-light micro LED.

12. The micro light-emitting diode display device of claim 1, wherein the first sub-pixel comprises a red-light conversion material, the fourth sub-pixel comprises another red-light conversion material, the second sub-pixel comprises a green-light conversion material, and the fifth sub-pixel comprises another green-light conversion material.

13. The micro light-emitting diode display device of claim 12, wherein each of the first sub-pixel, the second sub-pixel and the third sub-pixel further comprises a blue-light micro LED, each of the fourth sub-pixel, the fifth sub-pixel and the sixth sub-pixel further comprises another blue-light micro LED, and a light wavelength of the blue-light micro LEDs configured in the second display pixel is greater than or equal to a light wavelength of the blue-light micro LEDs configured in the first display pixel.

14. The micro light-emitting diode display device of claim 1, wherein each of the first sub-pixel, the third sub-pixel, the fourth sub-pixel and the sixth sub-pixel comprises a blue-light micro LED, the blue-light micro LEDs have the same light wavelength, the first sub-pixel further comprises a red-light conversion material, the fourth sub-pixel further comprises another red-light conversion material, each of the second sub-pixel and the fifth sub-pixel comprises a green-light micro LED, and the green-light micro LEDs have different light wavelengths.

15. The micro light-emitting diode display device of claim 1, wherein each of the first sub-pixel, the second sub-pixel, the third sub-pixel, the fourth sub-pixel, the fifth sub-pixel and the sixth sub-pixel comprises a blue-light micro LED, a red-light conversion material and a green-light conversion material, the blue-light micro LEDs have the same light wavelength, a radiation wavelength of the red-light conversion materials configured in the second display pixel is less than a radiation wavelength of the red-light conversion materials configured in the first display pixel, and a radiation wavelength of the green-light conversion materials configured in the second display pixel is greater than a radiation wavelength of the green-light conversion materials configured in the first display pixel.

16. The micro light-emitting diode display device of claim 15, wherein each of the first sub-pixel and the fourth sub-pixel further comprises a red-light color filter, each of the second sub-pixel and the fifth sub-pixel further comprises a green-light color filter, and each of the third sub-pixel and the sixth sub-pixel further comprises a blue-light color filter.

17. The micro light-emitting diode display device of claim 1, wherein the control unit controls the driving unit to selectively drive the first display pixels of the pixel units to display a color image or drive the second display pixels of the display units to display a black-and-white image.

* * * * *